United States Patent
Zhu et al.

(10) Patent No.: US 10,411,841 B2
(45) Date of Patent: Sep. 10, 2019

(54) METHOD AND APPARATUS FOR NON-ADAPTIVE RETRANSMISSION

(75) Inventors: Xudong Zhu, PuDong Jinqiao Shanghai (CN); Jin Liu, PuDong Jinqiao Shanghai (CN)

(73) Assignee: Alcatel Lucent, Nozay (FR)

( * ) Notice: Subject to any disclaimer, the term of this patent is extended or adjusted under 35 U.S.C. 154(b) by 1135 days.

(21) Appl. No.: 13/817,077

(22) PCT Filed: Jul. 29, 2011

(86) PCT No.: PCT/IB2011/002071
§ 371 (c)(1),
(2), (4) Date: Feb. 14, 2013

(87) PCT Pub. No.: WO2012/023036
PCT Pub. Date: Feb. 23, 2012

(65) Prior Publication Data
US 2013/0148584 A1    Jun. 13, 2013

(30) Foreign Application Priority Data

Aug. 17, 2010 (CN) .......................... 2010 1 0255621

(51) Int. Cl.
*H04W 4/00* (2018.01)
*H04L 1/18* (2006.01)
*H04L 5/00* (2006.01)

(52) U.S. Cl.
CPC .......... *H04L 1/1893* (2013.01); *H04L 5/0051* (2013.01)

(58) Field of Classification Search
CPC ... H04L 1/1816; H04L 1/1893; H04L 5/0059; H04W 4/00; H04W 80/04; H04W 88/06; H04W 88/08
(Continued)

(56) References Cited

U.S. PATENT DOCUMENTS 8,289,935 B2    10/2012   Frederiksen et al.
8,503,425 B2    8/2013    Chung et al.
(Continued)

FOREIGN PATENT DOCUMENTS

CN          101272608 A       9/2008
WO      WO 2009/056464 A1     5/2009
(Continued)

OTHER PUBLICATIONS

3GPP TSG-RAN WG1#61 bis R1-103606.*
(Continued)

*Primary Examiner* — Un C Cho
*Assistant Examiner* — Voster Preval
(74) *Attorney, Agent, or Firm* — Fay Sharpe LLP

(57) ABSTRACT

The present invention provides a method and apparatus for use in non-adaptive retransmission. The method comprises: configuring an uplink UL demodulation reference signal DM-RS for retransmission in response to a retransmission request. In one embodiment, the demodulation reference signal DM-RS is configured to be the same as a demodulation reference signal for an initial transmission. In another embodiment, the demodulation reference signal DM-RS is configured with respect to the number of layer(s) for retransmission according to predetermined rules for the initial transmission.

12 Claims, 3 Drawing Sheets

(58) Field of Classification Search
USPC .................................................. 370/329, 328
See application file for complete search history.

(56) References Cited

U.S. PATENT DOCUMENTS

| | | | | |
|---|---|---|---|---|
| 2009/0175233 | A1* | 7/2009 | Ojala | H04L 1/1854 370/329 |
| 2010/0173625 | A1 | 7/2010 | Noh et al. | |
| 2011/0170499 | A1* | 7/2011 | Nayeb Nazar | H04L 1/1812 370/329 |
| 2011/0206089 | A1* | 8/2011 | Cho | H04W 72/042 375/141 |
| 2011/0317596 | A1* | 12/2011 | Jongren | H04L 5/0053 370/280 |
| 2011/0317646 | A1* | 12/2011 | Luo | H04L 1/06 370/329 |
| 2012/0170683 | A1* | 7/2012 | Frederiksen | H04L 1/1607 375/308 |
| 2012/0218882 | A1* | 8/2012 | Ko et al. | 370/216 |
| 2012/0250656 | A1* | 10/2012 | Noh | H04L 5/0023 370/330 |
| 2012/0250663 | A1* | 10/2012 | Han | H04L 1/06 370/336 |
| 2013/0148584 | A1* | 6/2013 | Zhu | H04L 1/1893 370/328 |
| 2015/0131472 | A1* | 5/2015 | Nishio et al. | 370/329 |

FOREIGN PATENT DOCUMENTS

| | | | |
|---|---|---|---|
| WO | WO 2009056464 | A1 * | 5/2009 |
| WO | WO 2009/098224 | | 8/2009 |
| WO | WO 2010/011083 | A2 | 1/2010 |
| WO | WO 2010/051663 | A1 | 5/2010 |

OTHER PUBLICATIONS

International Search Report for PCT/IB2011/002071 dated Feb. 9, 2012.

"PHICH Mapping for UL SU-MIMO," $3^{rd}$ Generation Partnership Project (3GPP), 3GPP TSG-RAN WG1 #61bis, Dresden, Germany, Jun. 28-Jul. 3, 2010, pp. 1-4.

"Cyclic Shift Mapping of PHICH Resources for UL MIMO," $3^{rd}$ Generation Partnership Project (3GPP), 3GPP TSG-RAN WG2 #61, Montreal Canada, May 10-14, 2010, pp. 1-4.

"Precoding for UL SU-MIMO in PHICH-triggered retransmission," $3^{rd}$ Generation Partnership Project (3GPP), 3GPP TSG-RAN WG2 #61bis, Dresden, Germany, Jun. 28-Jul. 2, 2010, pp. 14.

"Conveying OCC for PUSCH Transmissions," $3^{rd}$ Generation Partnership Project (3GPP), 3GPP TSG-RAN WG2 #61bis, Dresden, Germany, Jun. 28-Jul. 2, 2010, pp. 1-5.

"Further consideration on UL DM-RS for LTE-Advanced," $3^{rd}$ Generation Partnership Project (3GPP), 3GPP TSG-RAN WG2 #61, Montreal Canada, May 10-14, 2010, pp. 1-4.

"DM-RS Layer Mapping and Control Signalling," $3^{rd}$ Generation Partnership Project (3GPP), 3GPP TSG-RAN WG2 #61, Montreal Canada, May 10-14, 2010, pp. 1-6.

Way Forward on CN and OCC signaling for UL DMRS, $3^{rd}$ Generation Partnership Project (3GPP), 3GPP TSG-RAN WG2 #61bis, Dresden, Germany, Jun. 28-Jul. 2, 2010, pp. 1-2.

Alcatel-Lucent Shanghai Bell, Alcatel-Lucent, "Further Discussions on UL Transmission Modes and DCI Format Designs," 3GPP TSG RAN WG1 Meeting #62, R1-104399, Madrid, Spain, Aug. 23-27, 2010, Agenda Item: 6.4.1, Document for: Discussion/Decision, 9 pages.

MCC Support, Final Report of 3GPP TSG RAN WG1 Meeting #61bis, R1-104183, Dresden, Germany Jun. 28-Jul. 2, 2010.

* cited by examiner

METHOD AND APPARATUS FOR NON-ADAPTIVE RETRANSMISSION

FIELD OF THE INVENTION

Exemplary non-limiting embodiments of the present invention generally relate to a wireless communication system, a method, an apparatus and a computer program, and more particularly, to non-adaptive retransmission in the uplink.

BACKGROUND OF THE INVENTION

3GPP long term evolution LTE technology aims to achieve higher data rate, shorter delay, less cost, higher system capacity and improved coverage scope. Multi-input multi-output MIMO technology is a crucial technology in enhancement of frequency spectrum efficiency.

In the MIMO wireless communication system, a transmitter and a receiver both use an antenna array, thereby providing rich space diversity and large communication capacity. Space multiplexing is a common space-time modulating technology for use in the MIMO communication system, wherein independent data streams are transmitted through different transmitting antennas.

In the LTE-A, the uplink supports single user MIMO (SU-MIMO), i.e., the uplink supports transmission of a plurality of antennas. This requires to provide a plurality of uplink UL demodulation reference signals (DM-RS) for all the space layers multiplexed together so that channel estimation can be carried out for each layer at a receiving end. The reference signal RS, as commonly called "pilot signal", is a known signal provided by a transmitting end to the receiving end for channel estimation, synchronization or channel detection. Just as the technical term implies, the uplink UL demodulation reference signal DM-RS is used as a reference for data demodulation, whereby estimation is carried out with respect to the channel parameters, such as the phase and the amplitude by using the UL DM-RS, and thereby data transmitted on uplink can be demodulated correctly.

At the 3GPP RAN1 #57 meeting, the following DM-RS multiplexing principles are agreed in respect of supporting the uplink space multiplexing.
   performing different cyclic shifts CSs for a pilot symbol serves as a main multiplexing mechanism;
   multiplying different orthogonal cover codes OCCs between different time slots of the same data frame serves a complementary multiplexing mechanism.

All the uplink DM-RSs have a reference signal sequence in the same form. The uplink DM-RS sequences in the LTE system can be defined by a base sequence plus cyclic shifts. Different amount of cyclic shifts is used for a base sequence, and a plurality of reference signal sequences can be defined.

An optimal orthogonality can be provided between different reference signals RSs by using the CS together with the OCC for DM-RS multiplexing, thereby providing an optimal performance.

However, space multiplexing is extremely sensitive to bad conditions of the channel. Hence, a hybrid automatic retransmission request HARQ mechanism is used to ensure correctness of transmission. The HARQ can be classified into two types, namely, adaptive retransmission and non-adaptive retransmission, depending on whether data characteristics upon retransmission change. The data characteristics comprise allocation of resource block, modulation mode, length of transmission block, duration of transmission and so on.

The adaptive retransmission means that in each retransmission procedure, the transmitting end can change partial transmission parameters according to actual channel state information, so support from relevant control signaling is needed.

In the non-adaptive retransmission, these transmission parameters are already known in advance to the receiving end, that is, the transmitting end and the receiving end are informed before the initial transmission. Hence, the non-adaptive system does not need the support of the corresponding control signaling.

Because of the complexity in the uplink, and interference from users in other cells is uncertain, the base station cannot accurately estimate actual SINR value of each user. Therefore, the 3GPP LTE system permits use of the non-adaptive HARQ technology in the uplink.

In the current LTE-A standardization procedure, the non-adaptive HARQ technology in the uplink is still under discussion and study. To date, there is not yet provided a corresponding solution about how to configure the DM-RS(s) when the user equipment UE carries out retransmission in the uplink.

SUMMARY OF THE INVENTION

In view of the above, embodiments of the present invention provides a solution about configuring the DM-RS(s) when the user equipment UE carries out retransmission in the case that there is not an explicit signaling, i.e., in a non-adaptive system.

According to an exemplary aspect of the present invention, there is provided a method for use in non-adaptive retransmission, the method comprising: configuring an uplink UL demodulation reference signal DM-RS for retransmission in response to a retransmission request.

In a first embodiment, the demodulation reference signal DM-RS can be configured to be the same as a demodulation reference signal for the initial transmission.

In a second embodiment, the demodulation reference signal DM-RS can be configured with respect to the transmission situation in retransmission according to predetermined rules for the initial transmission, wherein the transmission situation in the retransmission can be the number of layer(s) for retransmission.

Further, in the above second embodiment, cyclic shift indicator CSI in downlink control information DCI is received, the cyclic shift indicator CSI indicates configuration of the demodulation reference signal of the first layer for initial transmission; configuration of demodulation reference signal of layer(s) for the retransmission is derived with respect to the number of layer(s) for retransmission according to the predetermined rules for the initial transmission, based on the received cyclic shift indicator CSI.

Furthermore, configuring the demodulation reference signal DM-RS comprises configuring the cyclic shift CS and the orthogonal cover code OCC of the DM-RS.

According to another exemplary aspect of the present invention, there is provided an apparatus for use in non-adaptive retransmission, the apparatus comprising: configuration means for configuring an uplink UL demodulation reference signal DM-RS for retransmission in response to a retransmission request.

In a first embodiment, the configuration means can be used to configure the demodulation reference signal DM-RS to be the same as a demodulation reference signal for an initial transmission.

In a second embodiment, the configuration means can be used to configure the demodulation reference signal DM-RS with respect to the transmission situation in retransmission according to predetermined rules for the initial transmission, wherein the transmission situation in the retransmission can be the number of layer(s) for retransmission.

Furthermore, in the second embodiment, the apparatus further comprises: receiving means for receiving cyclic shift indicator CSI in downlink control information DCI, the cyclic shift indicator CSI indicating configuration of the demodulation reference signal of the first layer for initial transmission; the configuration means is further used to derive configuration of demodulation reference signal of layer(s) for the retransmission with respect to the number of layer(s) for retransmission according to the predetermined rules for the initial transmission, based on the received cyclic shift indicator CSI.

Other aspects of the present invention can further comprise a computer program product for implementing the above method and a storage medium for storing such program.

Embodiments of the present invention provide the non-adaptive retransmission system with a configuration solution of the uplink reference signal upon retransmission without explicit signaling.

The first embodiment of the present invention is simple to implement without needing standardization effort. The second embodiment of the present invention can obtain a maximum RS separation between different layers. The second embodiment needs standardization effort and has a little bit processing complexity for updating the OCC and CS for retransmission. However, such cost is ignorable. Besides, a mapping table of the optimized DM-RS configuration and the CSI is defined for the MU-MIMO. When the mapping table is combined with the second embodiment, it can be ensured that the same OCC is used for the two layers in the same UE, and possibly different OCCs are allocated for two UEs in the MU-MIMO. This increases the orthogonality of the DM-RSs, and is particularly adapted for unequal bandwidth allocation of the MU-MIMO.

BRIEF DESCRIPTION OF THE ACCOMPANYING DRAWINGS

The above-mentioned and other aspects of embodiments of the present invention will be made clearer and apparent upon reading the following detailed description in combination with the figures, wherein.

In all of the above figures, the same reference numbers denote the same, like or corresponding feature or function.

DETAILED DESCRIPTION OF THE PREFERRED EMBODIMENTS

Specific embodiments of the present invention will be exemplarily described in detail with reference to the figures.

Figure 1:
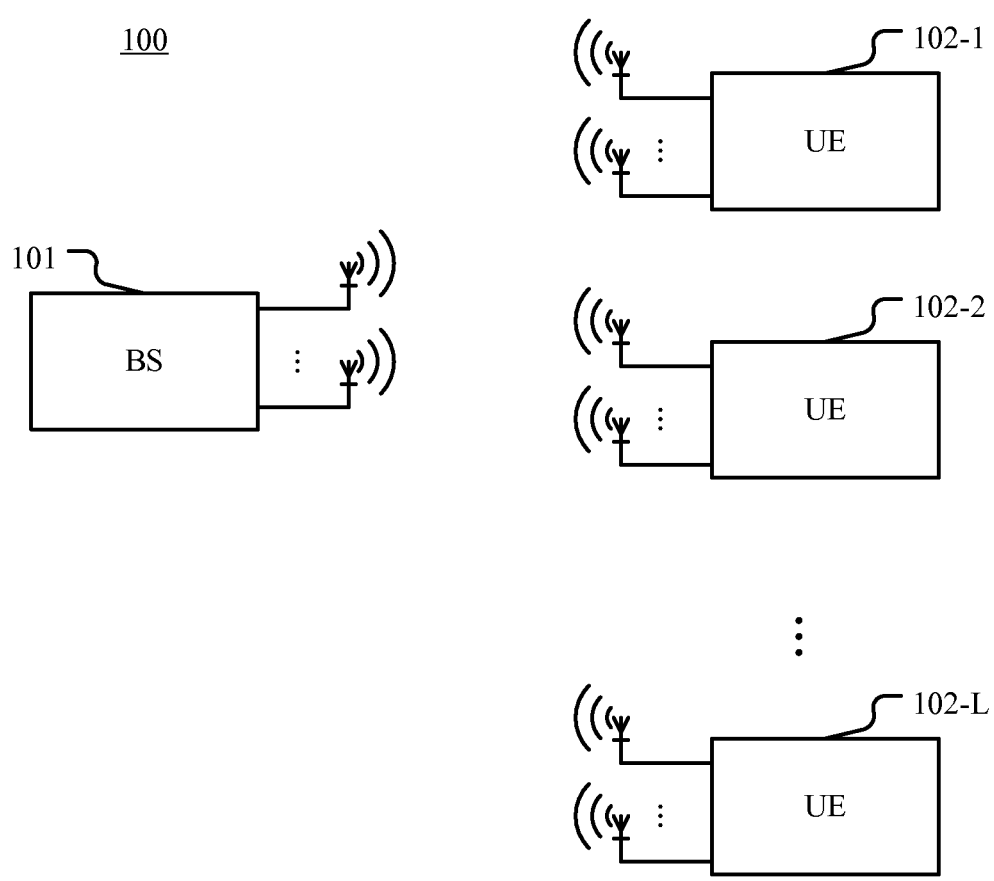
FIG. 1 illustrates an example of a wireless communication system environment in which the present invention can be implemented.

Referring to FIG. 1, the figure illustrates an example of a wireless communication system environment 100 in which the present invention can be implemented. As shown in FIG. 1, the wireless communication system environment 100 can comprise a base station BS 101 and a plurality of user equipment UE 102-1, 102-2 . . . 102-L, wherein L is an integer greater than or equal to 1. The base station BS 101 has M transmitting and receiving antennas, and each of user equipment UE102-1, 102-2, . . . 102-L has N transmitting and receiving antennas, wherein M and N are both greater than 1. In various embodiments, the base station BS 101 is also called eNB in LTE and LTE-A systems. In the depictions in the following text, various embodiments employ the base station eNB and user equipment UE for exemplary description.

In the LTE system, MIMO space multiplexing is usually realized by two portions, namely, layer mapping and pre-coding. Basically, one layer corresponds to one space multiplexing channel. The maximum number of layers is also called the number of code streams, which is equal to the degree of freedom of the MIMO channel. The number of layers of MIMO is also called as the rank of an MIMO system. As for a plurality of transmitting antenna ports, the rank is less than or equal to the number of antennas. An MIMO codeword will be respectively for channel coding and modulation, and is converted into information block for transmission on a single layer or multiple layers.

The MIMO technology is classified into singer user MIMO SU-MIMO and multi-user MIMO MU-MIMO. The SU-MIMO means that the eNB only serves one user at a certain instant, and the user has a plurality of transmitting and receiving antennas for space multiplexing. The MU-MIMO means that the eNB simultaneously serves multiple users (also called a user group), each of which has a plurality of transmitting and receiving antennas for space multiplexing.

Figure 2:
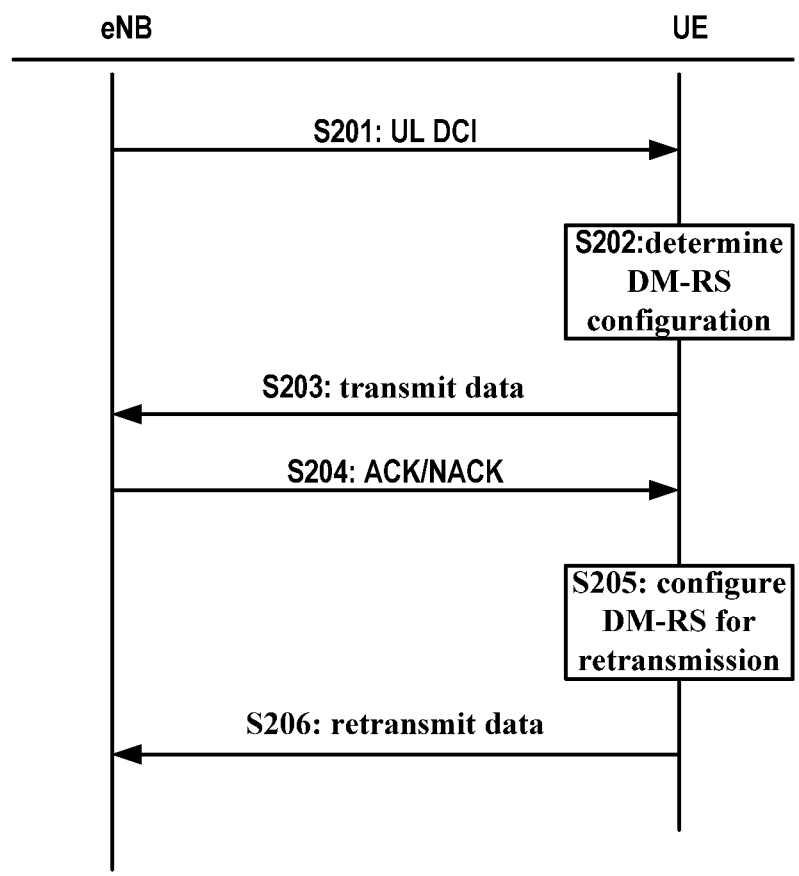
FIG. 2 shows an illustrative logic flowchart of a method according to an embodiment of the present invention.

Now referring to FIG. 2, the figure shows an illustrative logic flowchart of a method according to an embodiment of the present invention. The flow of FIG. 2 will be described in detail with reference the wireless communication system environment 100 as shown in FIG. 1.

FIG. 2 shows the base station eNB and an exemplary user equipment UE. As shown in the figure, in step S201, at the user equipment UE, downlink control information DCI is received from the base station eNB. As mentioned above, in order to support SU-MIMO in the uplink in the LTE-A, there is a need to send to the UE a plurality of cyclic shifts CSs and/or orthogonal cover codes OCCs for DM-RS multiplexing. In the current LTE-A discussion, in the DCI format, a 3-bit field is included so as to send a cyclic shift indicator CSI indicating the DM-RS configuration for initial transmission. The 3-bit field corresponds to a cyclic shift CS index, which is mapped to the DM-RS configuration for the first layer (marked as "layer-0).

As above stated, in the LTE Release 10, the cyclic shift CS separation serves as a main multiplexing mechanism, and the orthogonal cover code OCC separation is introduced between time slots to complement the orthogonality of the DM-RSs. The configuration of the DM-RS comprises a cyclic shift CS value and an OCC value. Therefore, the received cyclic shift indicator CSI is mapped to the cyclic shift CS value ($n_{DMRS,0}^{(2)}$) and OCC value ($n_{OCC,0}$) for the first layer (layer-0).

The above mapping relation can be directly expressed into a mapping table and stored in the base station eNB and the user equipment UE. As such, the user equipment UE can determine the DM-RS configuration indicated by the received CSI by searching the mapping table. For example, Table 1 shows an exemplary mapping table of the CSI and the DM-RS configuration for initial transmission according to an embodiment of the present invention. Those skilled in the art can appreciate that the mapping table in Table 1 is only exemplary and not limiting. Different mapping tables can be constructed according to different needs and certain rules.

TABLE 1

| Cyclic Shift Field In DCI format 0 | $n_{DMRS}^{(2)}$ | OCC |
|---|---|---|
| 000 | 0 | [+1 +1] |
| 001 | 6 | [+1 +1] |
| 010 | 3 | [+1 −1] |
| 011 | 4 | [+1 +1] |
| 100 | 2 | [+1 −1] |
| 101 | 8 | [+1 −1] |
| 110 | 10 | [+1 +1] |
| 111 | 9 | [+1 −1] |

Wherein when $n_{OCC}=0$, the corresponding OCC is [+1 +1]; when $n_{OCC}=1$, the corresponding OCC is [+1 −1].

Then, in step S202, the user equipment UE derives the DM-RS configurations of the remaining layers from the DM-RS configuration of the first layer according to the rules defined for the initial transmission based on the received CSI.

In the LTE-A, a CSI selection mode for the DM-RSs of respective space layers for the initial transmission has already been determined. For example, according to the following pre-determined rules, the DM-RS configurations of the remaining space layers for initial transmission are derived from the DM-RS configuration of the first layer for the initial transmission.

Regarding the CS of the $k^{th}$ (k=0, 1, 2, 3) layer, it can be derived based on a CS offset (Δk) and according to $n_{DMRS,k}^{(2)}=(n_{DMRS,0}^{(2)}+\Delta k)\mod 12$:

as for two space layers, the CS offset (Δk) is respectively 0,6(k=0,1);
as for four space layers, the CS offset (Δk) is respectively 0,6,3,9(k=0, 1, 2, 3);
 as for three space layers, the CS offset (Δk) is to be further studied. For example, it can be selected from {0,6,3} and {0,4,8} (k=0,1,2).

Regarding the OCC of $k^{th}$ (k=0, 1, 2, 3) layer, it can be derived from the OCC of the first layer (k=0):

as for k=1, $n_{OCC,k}=n_{OCC,0}$;
as for k=2,3, $n_{OCC,k}=1-n_{OCC,0}$.

In this way, the DM-RS configurations of respective space layers for initial transmission can be derived according to these predetermined rules.

Thereafter, in step S203, the user equipment UE carries out data transmission according to the configured DM-RSs, for example, transmission on the physical uplink sharing channel (PUSCH). This is initial transmission of data.

After the base eNB receives the initially transmitted data, the data can be demodulated. For example, by using the known DM-RS configurations, the base station eNB can carry out channel estimation of the uplink channel so as to determine properties of parameters such as phase and amplitude of the channel. Therefore, the received data can be correctly demodulated.

By means of various encoding and modulating modes, the base station eNB can determine whether the data is received correctly. Correspondingly, in the step S204, the user equipment UE receives a feedback signal ACK/NACK from the base station eNB. If the feedback signal is NACK, it means that the data of the space layers is not received correctly, and the user equipment UE must retransmit the data.

For example, a HARQ indicator channel (PHICH) is defined in the LTE to carry response information, and indicate whether the base station eNB receives correctly the data transmitted by the user equipment UE on the physical uplink sharing channel PUSCH.

In the current LTE system, the above steps S201-S204 are all defined explicitly. However, regarding the non-adaptive retransmission in the uplink, there is not yet provided a specific solution about how to configure the DM-RSs of the respective space layers to be retransmitted when the user equipment carries out retransmission.

For non-adaptive retransmission, there is no explicit signaling to inform what kind of DM-RS configurations should be utilized by the user equipment UE, so the user equipment UE does not know how to configure specifically. Besides, upon HARQ retransmission, the number of layers to be retransmitted might be varied for example when one codeword is received correctly while other codewords are not received correctly. The embodiments of the present invention take the above factors into account and provide several solutions for the user equipment UE to configure the DM-RSs upon retransmission.

According to embodiments of the present invention, in step S205, the user equipment UE configures the DM-RS for retransmission in response to the feedback signal NACK received from the base station eNB, i.e., in response to a retransmission request received from the base station eNB.

In a first embodiment of the present invention, configuring the DM-RS for retransmission can comprise configuring it to be the same as the DM-RS for initial transmission. The first embodiment of the present invention will be illustrated in detail with an example.

For the sake of brevity, first the SU-MIMO system is taken into consideration. Assume the number of layers for the user equipment UE space multiplexing is 3, i.e., the rank of the MIMO is 3, the cyclic shift indicator CSI received from the base station eNB is 000. According to the mapping table as shown in Table 1, the DM-RS configuration of the first layer (Layer-0) for the initial transmission can be determined as below:

$n_{DMRS,0}^{(2)}=0, OCC=[+1 +1]$.

Then the user equipment UE can derive the DM-RS configurations of the remaining two layers (Layer-1, Layer-2) according to the DM-RS configuration of Layer-0 and the above-mentioned rules defined for the initial transmission, with results thereof as shown in Table 2-1.

TABLE 2-1

| DM-RS Configurations for Initial Transmission | | |
|---|---|---|
| | 3 layers | |
| Initial Transmission | $n_{DMRS}^{(2)}$ | OCC |
| Layer-0 | 0 | [+1 +1] |
| Layer-1 | 6 | [+1 +1] |
| Layer-2 | 3 | [+1 −1] |

The user equipment UE carries out data transmission according to the DM-RS configurations in Table 2-1. Assume that the base station eNB correctly receives the codeword on the Layer-0, whereas the codewords on the Layer-1 and Layer-2 are not received correctly, the base station eNB returns a response message to the user equipment UE to indicate the codewords on Layer-1 and Layer-2 need to be retransmitted.

At this time, responsive to the retransmission request, the user equipment UE can configure the DM-RSs for retransmission to be the same as the DM-RSs for initial transmission, as shown in Table 2-2.

TABLE 2-2

DM-RS Configurations for Retransmission

| HARQ retransmission | 2 layers | |
|---|---|---|
| | $n_{DMRS}^{(2)}$ | OCC |
| Layer-0 | 6 | [+1 +1] |
| Layer-1 | 3 | [+1 −1] |

It is noted that in Table 2-2, since the number of layers for retransmission is changed to 2, the identifications thereof become Layer-0 and Layer-1 accordingly, but the DM-RS configurations thereof are the same as the DM-RS configurations of Layer-1 and Layer-2 (namely, layers for retransmission) upon initial transmission.

Obviously, the first embodiment can be readily implemented without need of standardization effort. However, the disadvantage thereof is also obvious, e.g., since the change of the number of layers (the number of layers is decreased) upon retransmission is not taken into account, sometimes the maximum RS separation cannot be achieved between the layers for retransmission. For instance, in above Table 2-2, the RS separation between two layers is 3.

For this reason, in a second embodiment according to the present invention, the DM-RS for retransmission is reconfigured with respect to the change of the transmission situation in retransmission according to the predetermined rules for the initial transmission, wherein change of the transmission situation in retransmission can be for example change of the number of layers for retransmission. The second embodiment according to the present invention is illustrated in detail by way of example as below.

Similarly, the SU-MIMO system is taken into account first. Still assume that the number of layers for the user equipment UE space multiplexing is 3, the cyclic shift indicator CSI received from the base station eNB is 000. According to the mapping table as shown in Table 1 and rules defined for initial transmission, the DM-RS configurations of the layers for the initial transmission can be determined, as shown in Table 3-1 below.

TABLE 3-1

DM-RS Configurations for Initial Transmission

| Initial transmission | 3 layers | |
|---|---|---|
| | $n_{DMRS}^{(2)}$ | OCC |
| Layer-0 | 0 | [+1 +1] |
| Layer-1 | 6 | [+1 +1] |
| Layer-2 | 3 | [+1 −1] |

The user equipment UE carries out data transmission according to the DM-RS configurations in Table 3-1. Similarly, assume that the codewords on Layer-1 and Layer-2 need to be retransmitted.

At this time, responsive to the retransmission request, the user equipment UE can configure the DM-RSs for retransmission with respect to the layers for retransmission according to the predetermined rules for initial transmission. As far as the example is concerned, the number of layers for retransmission is 2. Hence, referring to the above-mentioned derivation rules: as for two space layers, the CS offset (Δk) is respectively 0,6(k=0,1), the configurations as shown in Table 3-2 can be obtained.

TABLE 3-2

DM-RS Configurations for Retransmission

| HARQ retransmission | 2 layers | |
|---|---|---|
| | $n_{DMRS}^{(2)}$ | OCC |
| Layer-0 | 0 | [+1 +1] |
| Layer-1 | 6 | [+1 +1] |

It is noted that in Table 3-2, since the number of layers for retransmission is 2, the identifications thereof become Layer-0 and Layer-1 accordingly, and the DM-RS configurations thereof are derived from the initially received CSI according to the predetermined rules for initial transmission with respect to the number of layers for retransmission, which is 2.

Compared with the first embodiment, since the second embodiment reconfigures the DM-RS for retransmission according to the rules for initial transmission by taking into account the change of number of layers upon retransmission (e.g., the number of layers is decreased), a maximum RS separation between different layers can be obtained. For example, in the above Table 3-2, the RS separation between two layers is 6. The disadvantage of the second embodiment lies in the need of standardization effort and a little bit processing complexity for updating the OCC and CS for retransmission. However, such cost is ignorable.

Returning to FIG. 2, in step S205, the user equipment UE, responsive to the retransmission request of the base station eNB, configures the DM-RS for retransmission according to any one embodiment of the present invention. Thereafter, in step S206, the user equipment UE can use the configured DM-RS to retransmit the data.

After the base station eNB receives the retransmitted data, the DM-RS configuration for retransmission can be used to estimate the uplink channel so as to demodulate the data. Similarly, the data retransmitted for the first time might partially or totally be received incorrectly, and needs to be retransmitted again. At this time, as in the step S204, the base station eNB sends the feedback signal NACK to the user equipment UE to request retransmission. Step S205, S206, and S204 are repeated until all the data are already received correctly or the number of times of retransmission or transmission duration reaches a predetermined threshold value.

Two exemplary embodiments of the present invention are described above in combination with the SU-MIMO system. Then embodiments of the present invention will be described hereunder in view of the MU-MIMO system.

In the MU-MIMO system, the base station eNB simultaneously serves a plurality of users (also called a user group), each of which has a plurality of transmitting and receiving antennas for space multiplexing.

As for the uplink MU-MIMO, the same OCC should be applied to different layers of the same user equipment UE, whereby it is possible that different OCCs are used for different user equipments UEs. Table 4-1 shows an example of DM-RS configurations in view of MU-MIMO, wherein there are two space layers.

TABLE 4-1

DM-RS Configurations in View of MU-MIMO

| | 2 layers | |
|---|---|---|
| In view of MU-MIMO | $n_{DMRS}^{(2)}$ | OCC |
| Layer-0 | 0 | [+1 +1] |
| Layer-1 | 6 | [+1 +1] |

As a contrast, Table 4-2 shows an example of DM-RS configurations in view of SU-MIMO, wherein there are also two space layers.

TABLE 4-2

DM-RS Configurations in View of SU-MIMO

| | 2 layers | |
|---|---|---|
| In view of SU-MIMO | $n_{DMRS}^{(2)}$ | OCC |
| Layer-0 | 0 | [+1 +1] |
| Layer-1 | 6 | [+1 −1] |

To this end, there is a need to optimize the mapping table of the DM-RS configuration and CSI so as to ensure that the same OCC is used for the two layers of the same UE when the CSI is selected according to the predetermined rules.

When the first embodiment according to the present invention is used, for example, by referring to the DM-RS configurations for retransmission as shown in Table 2-2, it can be seen that the two layers Layer-0 and Layer-1 for retransmission employ different OCCs so that orthogonality between UEs cannot be ensured.

When the second embodiment according to the present invention is employed, by referring to the DM-RS configurations for retransmission as shown in Table 3-2, it can be seen that the two layers Layer-0 and Layer-1 for retransmission employ the same OCC so that orthogonality between two UEs can be ensured.

The two embodiments are both based on the mapping table of the DM-RS configuration and CSI shown in the above Table 1. In the first embodiment, since the DM-RS configurations in the initial transmission is maintained, the selecting range of DM-RS configurations is very large, which makes it hard to design a suitable mapping table to optimize for MU-MIMO to ensure that different OCCs are employed between paired users of the MU-MIMO.

It can be seen from the mapping table of Table 1 that the mapping table is designed such that the same OCC is maintained between the two layers with a $n_{DMRS}$ separation as 6. Therefore, the DM-RS configurations for two-layer transmission are limited: there are only four pairs in total, namely, (0,6), (3,9), (4,10) and (2,8).

As such, in the second embodiment, use of such optimized mapping table can ensure the same OCC is used for the two layers in the same UE, and thereby make it possible to configure different OCCs for two UEs in the MU-MIMO. This increases the orthogonality of the DM-RSs, and is particularly adapted for unequal bandwidth allocation of the MU-MIMO.

It is known from the above depictions that the OCC and CS configurations for retransmission need to be taken into account carefully to ensure the maximum RS separation for retransmission. When the RS orthogonality between the paired users in the MU-MIMO is considered, preferably the second embodiment is selected to ensure the maximum RS separation and simplify the design of the mapping table.

Figure 3:
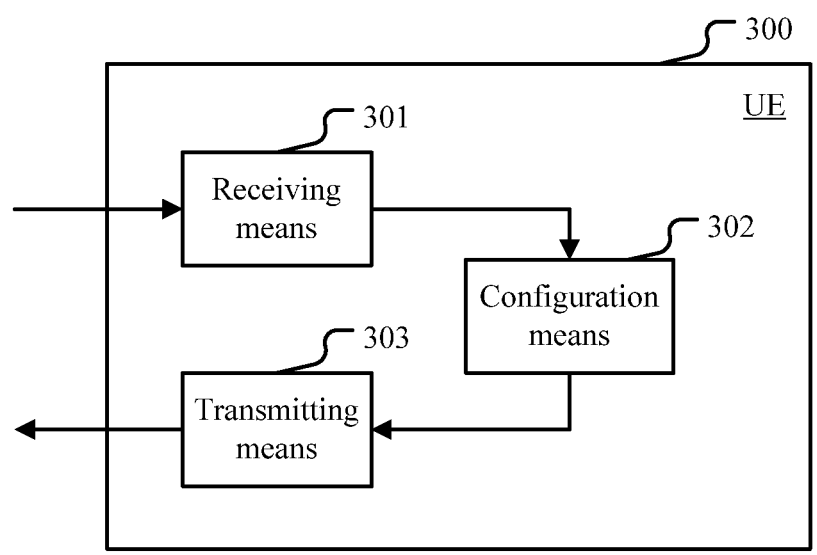
FIG. 3 illustrates an exemplary block diagram of an apparatus for implementing the present invention according to an embodiment of the present invention.

FIG. 3 illustrates an exemplary block diagram of an apparatus for implementing the present invention according to an embodiment of the present invention.

As shown in FIG. 3, the apparatus 300 can be located in the user equipment UE and comprise receiving means 301, configuration means 302 and transmitting means 303.

The receiving means 301 can be used to receive various information transmitted by the base station eNB, for example, the cyclic shift indicator CSI in the downlink control information DCI format 0, and response information ACK/NACK for the data. The cyclic shift indicator CSI indicates the DM-RS configuration of the first layer for the initial transmission.

As for the initial transmission, the configuration means 302 can derive the DM-RS configurations of the remaining layers for the initial transmission in response to the cyclic shift indicator CSI received by the receiving means 301 according to the predetermined rules for initial transmission.

As for the HARQ retransmission, the configuration means 302 can configure an uplink UL demodulation reference signal DM-RS for retransmission in response to the retransmission request (NACK) received by the receiving means 301.

In the first embodiment according to the present invention, the configuration means 301 can configure the demodulation reference signal DM-RS for retransmission to be the same as the DM-RS for initial transmission.

In the second embodiment according to the present invention, the configuration means 301 can derive the DM-RS configurations of the respective layers for retransmission with respect to the number of layers for retransmission according to the predetermined rules for the initial transmission.

These DM-RS configurations can comprise cyclic shifts CSs and orthogonal cover codes OCCs of DM-RSs.

The transmitting means 303 can transmit or retransmit the data according to the configuration of the configuration means 302.

Those skilled in the art may readily appreciate that the steps of the above various methods may be performed by a programming computer. In this text, some embodiments are intended to cover program storage devices, for example, a digital data storage medium that may be machine or computer-readable and programmed with a machine-executable or computer-executable instruction program, wherein these instructions perform part or all of the steps of the above methods. The program storage medium, for example, may be a digital storage, a magnetic storage medium (such as magnetic diskette or magnetic tape), hard driver, or optical readable digital data storage medium. The embodiments are also intended to cover a computer programmed to execute steps of the above method.

It should be noted that in order to make the present invention more comprehensible, the above description omits some more specific technical details which are known to the skilled in the art and may be essential to implement the present invention.

Those skilled in the art should understand these embodiments are exemplary and non-limiting. Different technical features appearing in different embodiments may be combined to achieve advantageous effects. Those skilled in the art should understand and implement other variations of the embodiments as depicted here based on the study on the drawings, specification, and claims. In these claims, the term "comprising" does not exclude other means or steps; the indefinite article "a/an" does not exclude plurality. Any reference signs in claims all shall not be understood as limiting the protection scope. Functions of a plurality of portions occurring in claims can be performed by individual hardware or software module. Appearance of some technical features in different dependent claims does not mean that these technical features cannot be combined to achieve advantageous effects.

Therefore, embodiments are selected and described in order to better construe principles of the present invention and actual application thereof and enable those having ordinary skill in the art to appreciate that all modifications and alterations without departure from the essence of the present invention fall within the protection scope of the present invention as defined by the appended claims.

What is claimed is:

1. A method for use in non-adaptive retransmission, the method comprising:
   receiving a cyclic shift indicator (CSI) in downlink control information (DCI), the cyclic shift indicator (CSI) indicating a configuration of an uplink (UL) demodulation reference signal (DM-RS);
   configuring the uplink (UL) demodulation reference signal (DM-RS) for retransmission in response to a retransmission request according to the received CSI, wherein said configuring comprises: configuring the demodulation reference signal (DM-RS) to be the same as a demodulation reference signal for an initial transmission.

2. The method according to claim 1, further comprising:
   receiving the cyclic shift indicator (CSI) in the downlink control information (DCI), the cyclic shift indicator (CSI) indicating the configuration of the demodulation reference signal of a first layer for the initial transmission; and
   deriving configurations of demodulation reference signals of remaining layer(s) for the initial transmission according to predetermined rules for the initial transmission based on the received cyclic shift indicator (CSI).

3. The method according to claim 1, wherein said configuring comprises: configuring a cyclic shift (CS) and an orthogonal cover code (OCC) of the demodulation reference signal (DM-RS).

4. A method for use in non-adaptive retransmission, the method comprising:
   receiving a cyclic shift indicator (CSI) in downlink control information (DCI), the cyclic shift indicator (CSI) indicating a configuration of an uplink (UL) demodulation reference signal (DM-RS);
   configuring the uplink (UL) demodulation reference signal (DM-RS) for retransmission in response to a retransmission request according to the received CS, wherein said configuring comprises: configuring the demodulation reference signal (DM-RS) with respect to a transmission situation in retransmission according to predetermined rules for an initial transmission.

5. The method according to claim 4, wherein the transmission situation in the retransmission comprises a number of layers for retransmission.

6. The method according to claim 5, further comprising:
   receiving the cyclic shift indicator (CSI) in the downlink control information (DCI), the cyclic shift indicator (CSI) indicating the configuration of the demodulation reference signal of the first layer for the initial transmission;
   wherein said configuring further comprises:
   deriving the configuration of demodulation reference signal of layer(s) for the retransmission with respect to the number of layer(s) for retransmission according to the predetermined rules for the initial transmission, based on the received cyclic shift indicator CSI.

7. An apparatus for use in non-adaptive retransmission, comprising:
   at least one processor configured to:
      receive a cyclic shift indicator (CSI) in downlink control information (DCI), the cyclic shift indicator (CSI) indicating configuration of an uplink (UL) demodulation reference signal (DM-RS); and
      configure the uplink (UL) demodulation reference signal (DM-RS) for retransmission in response to a retransmission request, wherein said configuring comprises: configuring the demodulation reference signal (DM-RS) to be the same as a demodulation reference signal for an initial transmission.

8. The apparatus according to claim 7, wherein the at least one processor is further configured to
   receive a cyclic shift indicator (CSI) in downlink control information (DCI), the cyclic shift indicator (CSI) indicating configuration of the demodulation reference signal of a first layer for an initial transmission; and
   to derive the configuration of demodulation reference signals of remaining layer(s) for the initial transmission according to the predetermined rules for the initial transmission, based on the received cyclic shift indicator (CSI).

9. The apparatus according to claim 7, wherein said at least one processor is further configured to configure a cyclic shift (CS) and an orthogonal cover code (OCC) of the demodulation reference signal (DM-RS).

10. An apparatus for use in non-adaptive retransmission, comprising:
    at least one processor configured to:
       receive a cyclic shift indicator (CSI) in downlink control information (DCI), the cyclic shift indicator (CSI) indicating configuration of an uplink (UL) demodulation reference signal (DM-RS); and
       configure the uplink (UL) demodulation reference signal (DM-RS) for retransmission in response to a retransmission request, wherein the at least one processor configures the demodulation reference signal (DM-RS) with respect to the transmission situation in retransmission according to predetermined rules for the initial transmission.

11. The apparatus according to claim 10, wherein the transmission situation in the retransmission comprises a number of layers for retransmission.

12. The apparatus according to claim 11, wherein the at least one processor is further configured to
    receive a cyclic shift indicator (CSI) in downlink control information (DCI), the cyclic shift indicator (CSI) indicating the configuration of the demodulation reference signal of a first layer for initial transmission; and
    to derive the configuration of demodulation reference signal(s) of layer(s) for the retransmission with respect to the number of layer(s) for retransmission according to the predetermined rules for the initial transmission, based on the received cyclic shift indicator (CSI).

* * * * *